Patented June 17, 1941

2,245,643

UNITED STATES PATENT OFFICE 2,245,643

WETTING AGENT AND METHOD OF PRODUCING THE SAME

Joseph N. Borglin, Wilmington, Del., assignor to Hercules Powder Company, Wilmington, Del., a corporation of Delaware No Drawing. Application March 15, 1940, Serial No. 324,118

19 Claims. (Cl. 260—512)

This invention relates to substituted diaryl and arylalkyl ether sulfonic acids. More particularly, it relates to condensation products of diaryl or aryl-alkyl ether sulfonic acids and terpenes or oxygenated terpene compounds. It also relates to a process for making these materials.

I have found that aromatic compounds substituted in the nucleus by a terpene radical or the radical of an oxygenated terpene compound may be obtained by condensing a diaryl or an alkyl-aryl ether with terpenes or with oxygenated derivatives thereof in the presence of a suitable acid condensing agent. I have also found that the resulting condensate may be converted into sulfonic acid derivatives by treatment with ordinary sulfonating agents. Alternatively, the process of condensation and sulfonation may be conducted simultaneously or the process may also be carried out by reacting a sulfonic acid derivative of a diaryl or an alkyl-aryl ether with a terpene or with an oxygenated derivative thereof in the presence of a suitable acid condensing agent.

The process in accordance with the present invention is applicable to suitable diaryl or alkyl-aryl ethers which I have found to be sulfonatable, among which are, for example, diphenyl ether, methylphenylether, ethylphenyl ether, butylphenyl ether and amylphenyl ether, phenylglyceryl ether, cresylmethyl ether, cresylethyl ether, cresylpropyl ether, monomethyl ether of resorcinol, dimethyl ether of resorcinol, dimethyl ether of catechol, trimethyl ether of pyrogallol.

Among the terpenes which I have found suitable for the hereinabove described condensation are pinene, dipentene, terpinene, terpinolene, etc. Among the oxygenated terpene compounds which may be considered as oxygen-bearing derivatives of the terpenes are such as, for example, terpineol, borneol, fenchyl alcohol, 1,4 terpin, 1,8 terpin, terpin hydrate, sobrerol, pinol glycol, terpinenol, 1,4 cineole, 1,8 cineole, beta-pinene glycol, sobrorerythritol, etc. Commercial cuts rich in terpenes such as gum turpentine, wood turpentine, and crude cuts rich in oxygenated terpene compounds such as pine oil, for example, may be utilized.

Among the substances which are suitable condensing agents in the method in accordance with this invention are: p-toluene sulfonic acid, sulfuric acid, chlorsulfonic acid, phosphoric acid, hydrochloric acid, aluminum chloride, zinc chloride, etc.

Among the sulfonating agents suitable in accordance with this invention are chlorsulfonic acid, sulfuric acid, sulfur trioxide, oleum, etc.

In proceeding in accordance with one of the procedures of this invention I take a terpene such as, for example, pinene, or an oxygenated terpene compound such as, for example, terpineol, and condense this with a diaryl ether or with an alkyl-aryl ether in the presence of a condensing agent such as mentioned before. I have found that the condensation takes place at temperatures ranging from about 100° C. to about 300° C. depending upon the condensing agent being used. When operating, for example, with p-toluene sulfonic acid as the condensing agent, I have found that the preferred temperature range is from about 200° C. to about 220° C.

The resultant condensate is then treated with a sulfonating agent selected from the group above mentioned. The sulfonation reaction may be carried out at temperatures ranging from about $-20°$ C. to $+50°$ C., but I prefer using a temperature from about $-5°$ C. to about $+35°$ C. If desired the sulfonated condensate so formed may then be neutralized with a base, such as, for example, sodium hydroxide, potassium hydroxide, triethanolamine, tetramethyl-ammonium hydroxide, trimethylbenzyl-ammonium hydroxide, ammonium hydroxide, pyridine, amylamine, morpholine, ethanolamine, diethanolamine, etc. After drying, a product results having good emulsifying and wetting out properties.

As an alternative procedure in accordance with this invention, I may also simultaneously conduct the condensation and sulfonation of a terpene or an oxygenated terpene compound and a diaryl ether or an alkyl-aryl ether. In this case the reaction temperatures will desirably, although not necessarily, be in the range mentioned above for the sulfonation reaction alone. As a further alternative procedure in accordance with this invention, I may first sulfonate the diaryl ether or the alkyl-aryl ether and then condense the resultant product with a terpene or an oxygenated terpene compound.

Furthermore, I have found that the above condensation products may, if desired, be further modified by condensation with an aldehyde, preferably, although not necessarily, an alkyl aldehyde, such as, for example, formaldehyde, acetaldehyde, paraformaldehyde, propylaldehyde, butyraldehyde, etc., prior to or subsequent to any neutralization of the sulfonated condensate.

All of the condensations and sulfonations described above may also be carried out in the presence of an inert solvent, such as, for example, ethylene dichloride, carbon tetrachloride, trichloroethane, tetralin, dichloroethyl ether, chloroform, etc.

Lightness in color of the products obtained by the method in accordance with this invention may be attained (1) by using terpenes or oxygenated terpene compounds which have been purified by steam distillation or by steam distillation in the presence of a base such as sodium hydroxide, potassium hydroxide, etc. (2) by using freshly distilled diaryl or alkyl-aryl ethers (3) by conducting the reactions in the presence of an inert atmosphere such as carbon dioxide or nitrogen.

Having now described in a general way the nature of this invention, I will now proceed to a more detailed disclosure thereof with reference to various examples, illustrating the practical adaptation of the invention. All parts shown are parts by weight.

Example I 350 parts of pinene, steam distilled in the presence of sodium hydroxide, was heated for four hours in an autoclave at 210° C. with 200 parts of diphenyl ether in the presence of 5 parts of p-toluene sulfonic acid. After removal of the excess pinene and diphenyl ether by steam distillation, and washing with water, the yield of condensate obtained was 399 parts.

100 parts of the condensate dissolved in 300 parts of carbon tetrachloride was sulfonated by adding 27 parts of chlor-sulfonic acid at 27° C. to 30° C., maintaining the mixture at such temperature for one-half hour, then neutralizing with sodium hydroxide and drying, thus obtaining 92 parts of the product.

Example II 350 parts of pinene, steam distilled in the presence of sodium hydroxide, was heated for four hours in an autoclave at 210° C. with 200 parts of diphenyl ether in the presence of 5 parts of p-toluene sulfonic acid. After removal of the excess pinene and diphenyl ether by steam distillation, and washing with water, the yield of condensate obtained was 399 parts.

100 parts of the condensate dissolved in 300 parts of carbon tetrachloride was sulfonated by adding 50 parts of chlor-sulfonic acid at 27° C. to 30° C., maintaining the mixture at such temperature for one-half hour, then neutralizing with sodium hydroxide, further treating the product so formed with 35 parts of a 40% by weight solution of formaldehyde at 20° C. to 25° C., and drying this reaction product.

Example III 200 parts of a mixture containing 115 parts of pinene, 83 parts of methylphenyl ether and 2 parts of p-toluene sulfonic acid was treated with 170 parts of 100.9% sulfuric acid at 15° C. to 20° C., maintaining the mixture at such temperature for one hour. The reaction product was then neutralized with sodium hydroxide, separated from inorganic salts by extraction with alcohol and dried, the final product being substantially free from inorganic salts.

Example IV

A mixture of 85 parts of diphenyl ether and 150 parts of pinene was reacted with 150 parts of 101% sulfuric acid at 25° C. to 30° C. The sulfuric acid was added dropwise over a period of about one hour, mechanically stirring the reaction mixture throughout this time. The so formed sulfonated pinene-phenyl ether condensate was then recovered by steam distilling off the excess pinene and diphenyl ether.

To prepare a neutralized condensate of the character hereinbefore described, 50 grams of the sulfonated pinene-diphenyl ether condensate were made slightly alkaline to methyl orange by adding thereto 160 cc. of a 40% aqueous solution of trimethylbenzyl ammonium hydroxide. The resulting product was then dried, yielding 73 grams of a white, somewhat flaky solid.

Example V

A mixture of 85 parts of diphenyl ether and 150 parts of pinene was reacted with 150 parts of 101% sulfuric acid at 25° C. to 30° C. The sulfuric acid was added dropwise over a period of about one hour, mechanically stirring the reaction mixture throughout this time. The so formed sulfonated pinene-phenyl ether condensate was then recovered by steam distilling off the excess pinene and diphenyl ether.

To prepare a neutralized condensate of the character hereinbefore described, 50 grams of the sulfonated pinene-diphenyl ether condensate were made slightly alkaline to methyl orange by adding thereto 55 cc. of triethanolamine. This mixture was placed in a vacuum oven for 8 hours at the end of which time 69 grams of a pale yellow liquid were obtained.

Example VI 127 grams of terpineol and 81 grams of methylphenyl ether were mixed and cooled to 15° C. To this mixture 178 grams of 100.9% sulfuric acid were added dropwise over a period of 1½ hours while agitating the mixture throughout the addition. The temperature of the reaction mixture was kept between 15 and 25° C. throughout the reaction. At the end of the reaction, a solution of 130 grams of sodium hydroxide in 130 grams of water was slowly added until the resulting mixture became slightly alkaline.

The product was then vacuum dried at 95° C. The solid residue was extracted with absolute ethyl alcohol to separate the insoluble salts from the sulfonated condensate, and the alcohol then evaporated from the extract. 50 grams of product, free from inorganic salts and completely water soluble, was obtained.

Example VII 240 grams of terpin and 137 grams of methylphenyl ether were mixed and cooled to 15° C. 240 grams of 100.9% sulfuric acid were then added dropwise over a period of one hour, the mixture being agitated throughout the addition. The temperature of the reaction mixture was kept between 15 and 25° C. The resulting mixture was then neutralized with 195 grams of sodium hydroxide dissolved in 220 grams of water. The material was then vacuum dried to give a yield of 385 grams of dry sulfonated condensate. Half of the product was washed with 40 grams of petroleum ether to remove any unsulfonated condensate. The washed product was then dried. A yield of 185 grams of this product was obtained. The product was completely soluble in water.

Example VIII 113 grams of pine oil and 57 grams of diphenyl ether were mixed and cooled to 15° C. 135 grams of 100.9% sulfuric acid were then added dropwise over a period of 1½ hours with agitation. The temperature of the reaction mixture was kept at 15–25° C. during this addition. A solution of 97 grams of sodium hydroxide dissolved in 120 grams of water was then slowly added until the mixture became slightly alkaline to litmus. The product was vacuum dried at 85° C. and then extracted with absolute ethyl alcohol to extract the sulfonated condensate from inorganic salts present. The alcohol was then evaporated from the alcohol extract leaving 24 grams of sulfonated pine oil-diphenyl ether condensate free of inorganic salts, and completely soluble in water.

*Example IX*

50 grams of terpineol, 65 grams of methylphenyl ether and 2 grams of para-toluene sulfonic acid were heated together at 210° C. for 5 hours in an autoclave. The product thus obtained was steam distillated to remove unreacted volatile materials. The resulting condensate was then water washed upon which a yield of 32 grams of condensate was obtained.

The condensate was dissolved with 115 grams of carbon tetrachloride and cooled to 15° C. Then 13 grams of chlorosulfonic acid was added dropwise and with agitation. The mixture was then neutralized with 9.5 grams of NaOH in 15 grams of water. The product thus obtained was vacuum dried, extracted with anhydrous alcohol and the alcohol evaporated from the extracted product. 21 grams of water soluble product were obtained.

*Example X*

A mixture of 85 grams of pine oil, 94 grams of diphenyl ether, and 5 grams of para-toluene sulfonic acid was heated to 220° C. for 6 hours in an autoclave. The resulting liquid was steam distilled to remove unreacted materials and the condensate (residue) was water washed. 122 grams of condensate was obtained.

80 grams of the pine oil-diphenyl ether condensate was mixed with 300 grams of carbon tetrachloride and cooled to 15° C. Then 33 grams of chlorosulfonic acid was added dropwise while the mixture was agitated. The mixture was neutralized by slowly adding a solution of 23 grams of NaOH in 23 grams of water. The product thus obtained was vacuum dried, washed with 60 grams petroleum ether. The washed product was then dried, whereby 71 grams of product was obtained.

The products obtained in accordance with this invention in the form of the free acids or of products obtained by neutralization of the free acids with a suitable base produce clear solutions in water and show excellent wetting, emulsifying and cleansing properties. Furthermore, the emulsifying action of these products, especially at low concentrations of emulsifier, is superior to that of the prior art emulsifiers.

This application is a continuation-in-part of my application, Serial No. 172,859, filed November 4, 1937, now U. S. Patent 2,202,281, disclosing but not claiming sulfonated oxygenated terpene compound-aryl ether condensates.

It will be understood that the examples hereinbefore set forth are illustrative only, and that the invention as broadly described and claimed is in no way limited thereby.

What I claim and desire to protect by Letters Patent is:

1. The process of preparing sulfonic acids of high wetting, cleansing and emulsifying properties which includes the step of condensing an oxygenated terpene with an ether containing an aryl group and the step of sulfonating the said aryl group.

2. The process of preparing sulfonic acids of high wetting, cleansing and emulsifying properties which consists in sulfonating a compound from the group consisting of diaryl and alky-aryl ethers and then condensing with an oxygenated terpene.

3. The process of preparing sulfonic acids of high wetting, cleansing and emulsifying properties which consists in condensing an ogygenated terpene with a compound from the group consisting of diaryl ethers and alkyl-aryl ethers and sulfonating the product.

4. The process of preparing sulfonic acids of high wetting, cleansing and emulsifying properties which consists in simultaneously condensing and sulfonating a mixture of an oxygenated terpene and a compound from the group consisting of diaryl ethers and alkyl-aryl ethers.

5. A product from the group consisting of the product obtained by the process of claim 1 and the product obtained by neutralizing with a suitable base the product obtained by the process of claim 1 said product being soluble in water and forming clear solutions therein having high wetting, emulsifying, and cleansing properties.

6. The process of preparing sulfonic acids of high wetting, cleansing and emulsifying properties which consists in condensing an oxygenated terpene with diphenyl ether and sulfonating the product.

7. A product from the group consisting of the product obtained by the process of claim 6 and the product obtained by neutralizing with a suitable base the product obtained by the process of claim 6 said product being soluble in water and forming clear solutions therein having high wetting, emulsifying, and cleansing properties.

8. The process of preparing sulfonic acids of high wetting, cleansing and emulsifying properties which consists in condensing an oxygenated terpene with methylphenyl ether and sulfonating the product.

9. A product from the group consisting of the product obtained by the process of claim 8 and the product obtained by neutralizing with a suitable base the product obtained by the process of claim 8 said product being soluble in water and forming clear solutions therein having high wetting, emulsifying, and cleansing properties.

10. The process of preparing sulfonic acids of high wetting, cleansing and emulsifying properties which consists in condensing an oxygenated terpene with a compound from the group consisting of diaryl ethers and alkyl-aryl ethers and sulfonating the product.

11. A product from the group consisting of the product obtained by the process of claim 10 and the product obtained by neutralizing with a suitable base the product obtained by the process of claim 10 said product being soluble in water and forming clear solutions therein having high wetting, emulsifying, and cleansing properties.

12. The process of preparing sulfonic acids of high wetting, cleansing and emulsifying properties which consists in condensing an oxygenated terpene with diphenyl ether and sulfonating the product.

13. A product from the group consisting of the product obtained by the process of claim 12 and the product obtained by neutralizing with a suitable base the product obtained by the process of claim 12 said product being soluble in water and forming clear solutions therein having high wetting, emulsifying, and cleansing properties.

14. The process of preparing sulfonic acids of high wetting, cleansing and emulsifying properties which consists in condensing an oxygenated terpene with methylphenyl ether and sulfonating the product.

15. A product from the group consisting of the product obtained by the process of claim 14 and the product obtained by neutralizing with a suitable base the product obtained by the process of claim 14 said product being soluble in water and forming clear solutions therein having high wetting, emulsifying, and cleansing properties.

16. The process of preparing sulfonic acids of high wetting, cleansing and emulsifying properties which consists in condensing an oxygenated terpene with a compound from the group consisting of diaryl ethers and alkyl-aryl ethers, sulfonating and condensing the reaction product with an aldehyde.

17. A product from the group consisting of the product obtained by the process of claim 16 and the product obtained by neutralizing with a suitable base the product obtained by the process of claim 16 said product being soluble in water and forming clear solutions therein having high wetting, emulsifying, and cleansing properties.

18. The process of preparing sulphonic acids of high wetting, cleansing, and emulsifying properties which includes the step of condensing terpineol with an ether containing an aryl group and the step of sulphonating the said aryl group.

19. A product from the group consisting of the product obtained by the process of claim 18 and the product obtained by neutralizing with a suitable base the product obtained by the process of claim 18, said product being soluble in water and forming clear solutions therein having high wetting, emulsifying, and cleansing properties.

JOSEPH N. BORGLIN.